United States Patent Office 2,805,586
Patented Sept. 10, 1957

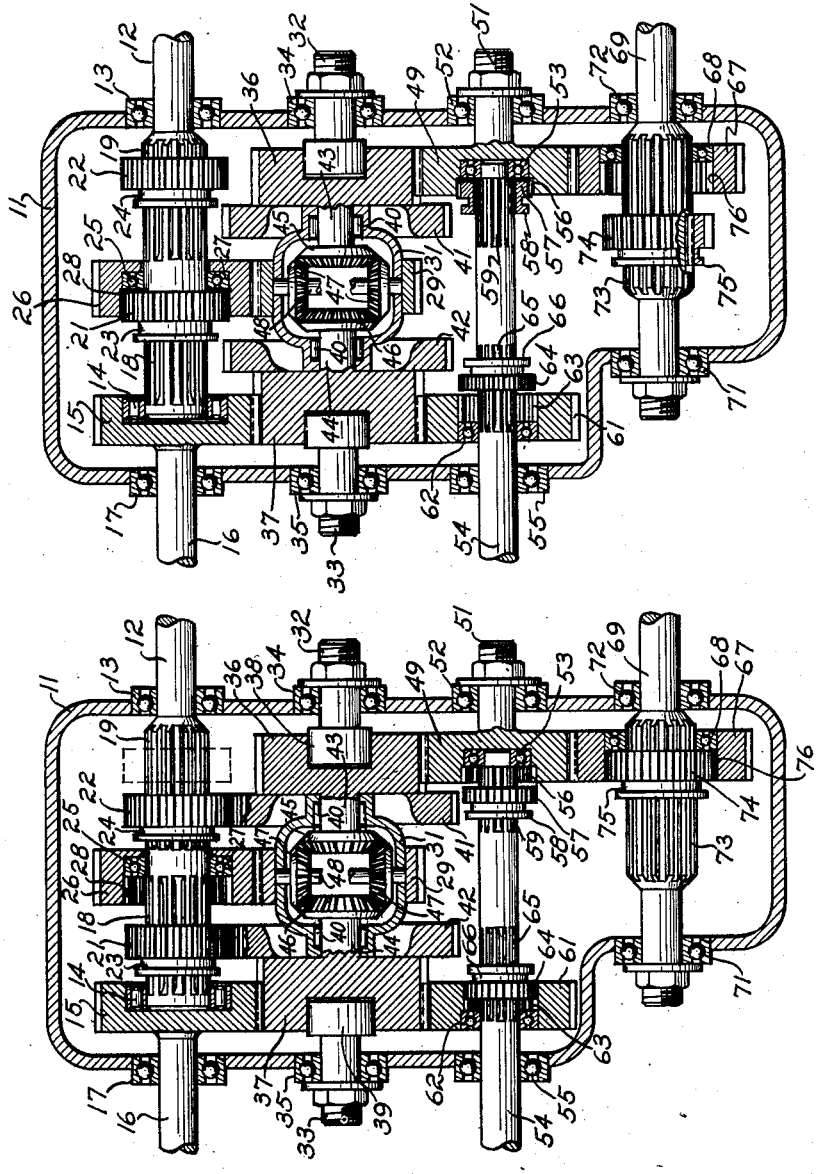

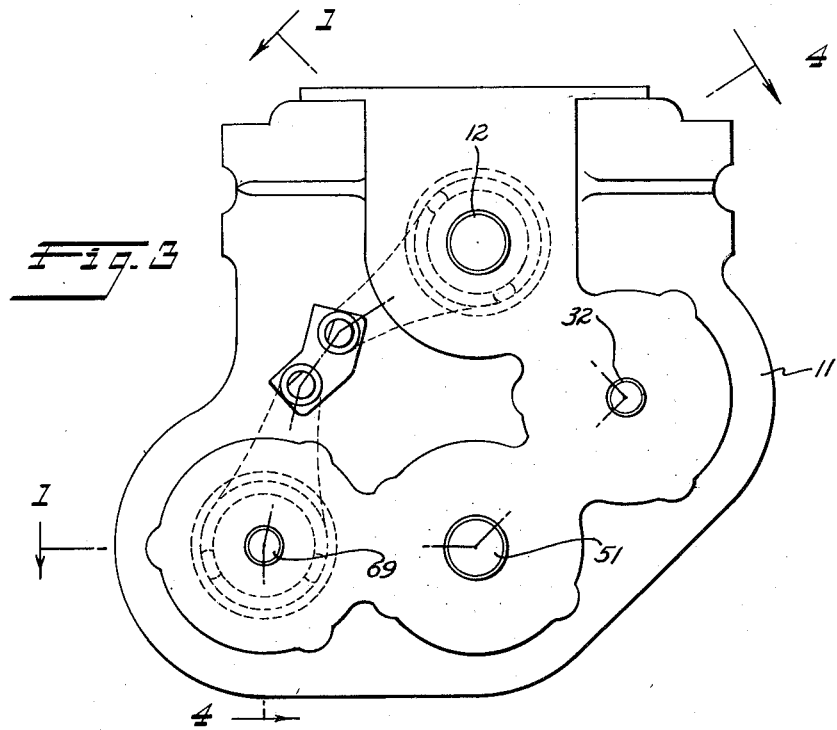
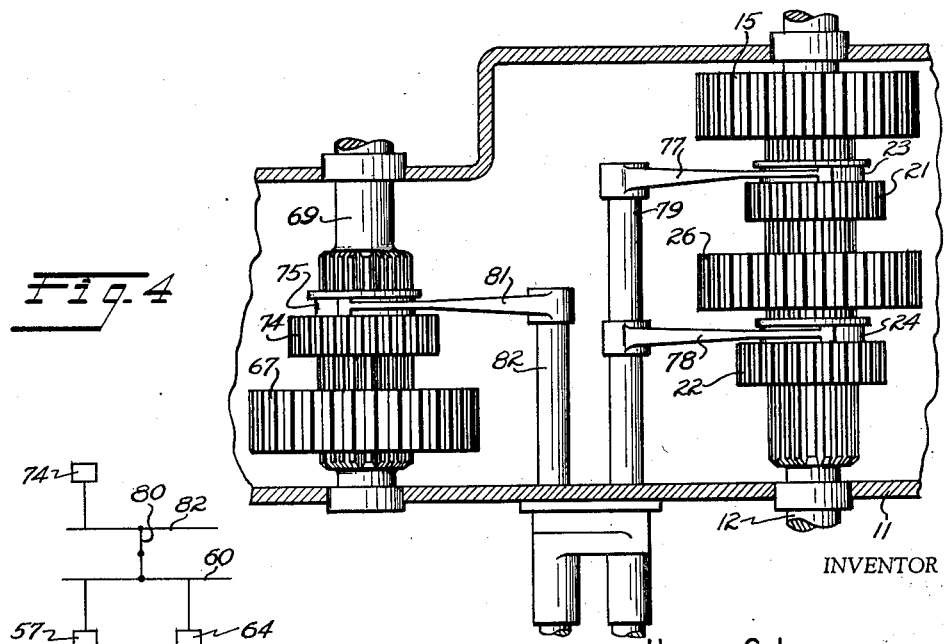

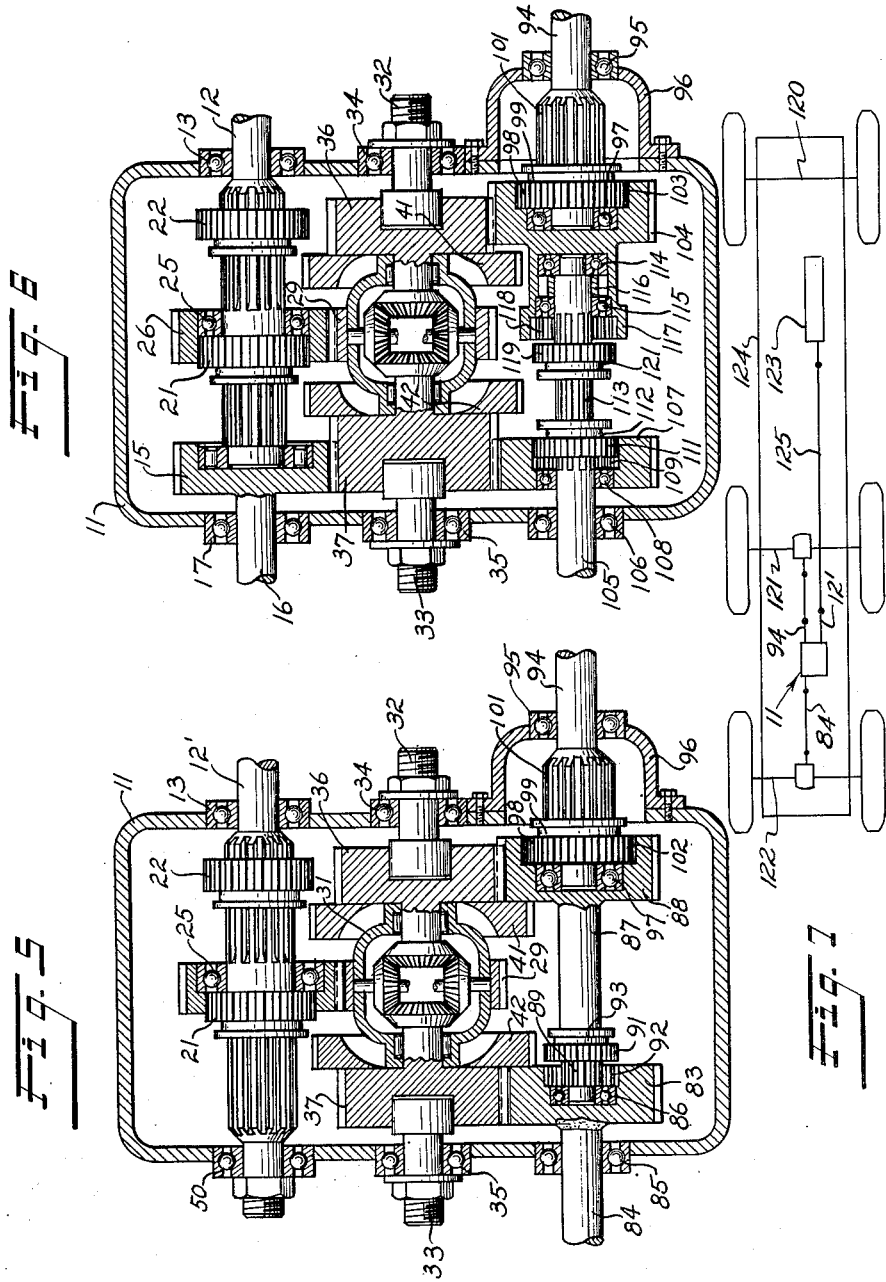

2,805,586

TRANSFER CASE APPLICATION

Harry G. Lucas, Jacksonville, Fla.

Application May 14, 1952, Serial No. 287,775

10 Claims. (Cl. 74—665)

This invention relates to heavy duty vehicle power transmitting mechanism and is particularly concerned with auxiliary transmissions or so-called transfer cases wherein the drive from an engine is divided and transmitted to different axles. The invention is especially adapted for heavy duty operation over rugged terrain.

Transfer cases of the general type of the invention have been proposed and are standard construction in all front axle drive military motor trucks and in many commercial vehicles such as logging trucks.

In these vehicles the power divided in the transfer case is usually directly applied to the various axles. If the ground engaging wheels are all of the same size and traction conditions are the same and other conditions are such that they all rotate at the same speed, there is no difficulty. However, these vehicles are intended for travel over rugged terrain and poor traction surfaces and a positive drive which does not take into account these factors results in uneven and excessive tire wear and undue stresses in the transfer case arising from these unequal drive tendencies. The latter shows up in damaged internal mechanism of the case and particularly in broken transfer case housings, and it is an object of the invention to provide a transfer case mechanism which does not subject the housing to such destructive forces.

Under the military program this art has undergone considerable development and in some of these prior transfer cases it has been recognized that the provision of an optional differential drive in the transfer case would contribute to flexibility of operation under widely different traction conditions. An example of such a structure having an optional differential drive which has been widely used commercially is disclosed in United States Letters Patent to Bock No. 2,158,320.

In the Bock structure power normally flows from the input shaft through a differential to spaced output shafts, but when heavy going is encountered one side of the differential is locked to the input shaft during low speed drive to provide a direct drive to the output shafts. It has been observed that in structures of this type, since the differential spider and pinion gears remain in the power drive train when the differential is locked, the large stresses encountered during low speed positive drive often cause mechanical failure at the differential. During prolonged low speed operations as in logging trucks, stripped differential gearing may result. This might be avoided by using larger differential gearing but limitations of space and cost do not permit such reconstruction.

Hence there has been a real demand in both military and commercial vehicles for a transfer case structure which is rugged enough to withstand constant low speed direct drive for long periods and at the same time be capable of differential operation to suit certain speed, traction or other operational conditions, and it is the major object of my invention to provide such a transfer case which is of novel construction for accomplishing the purpose.

It is a further object of the invention to provide a novel transfer case structure for a vehicle wherein optional direct and differential drives are available and wherein the differential is bypassed when direct drive is employed.

It is an object of the invention to provide a novel multispeed transfer case mechanism wherein power from a driving input shaft can be differentially applied to two driven output shafts in normal speed operation or positively applied to said output shafts for low speed operation, and wherein the differential mechanism is effectively bypassed in direct drive.

A further object of the invention is to provide in novel subcombination an input and differential gearing arrangement adapted for incorporation in a standard transfer case housing for providing a rugged and efficient drive in multi-axle drive vehicles.

A further object of the invention is to provide in a transfer case a novel differential and associated axle drive gear mechanism for optional direct or differential drive through the transfer case.

A further object of the invention is to provide a novel vehicle transfer case structure wherein an input shaft driven by an engine may be selectively connected to drive a plurality of axle drive shafts either through a differential or through a gear train bypassing the differential.

A further object of the invention is to provide for a 6 x 6 vehicle a transfer case having an engine driven input shaft and mechanism for driving two rear axle drive shafts differentially with respect to the front axle drive shaft.

It is a further object of my invention to provide a novel differential and bypass gearing arrangement for installation in a standard type transfer case for converting the latter to the invention.

A further object of my invention is to provide for a 6 x 6 vehicle a novel multispeed transfer case mechanism between an engine driven input shaft and two rear axle and one front axle drive shafts, wherein all three axle drive shafts may be directly driven, the two rear axle drive shafts may be differentially driven with respect to the front axle drive shaft, the two rear axle drive shafts may be differentially driven with the front axle drive disengaged, or the two rear axle drive shafts directly driven with the front axle disengaged.

It is a further object of my invention to provide for a 4 x 4 vehicle a novel transfer case mechanism between an engine driven input shaft and the front and rear axle drive shafts an optional direct or differential drive and wherein the differential gearing is bypassed in direct drive.

Further objects of the invention will appear as the description proceeds in connection with the appended claims and the annexed drawings wherein:

Figure 1 is a section on line 1—1 of Figure 3 showing the internal gearing of a transfer case according to a preferred embodiment of my invention and in direct drive for low speed;

Figure 2 is a section like Figure 1 but with the parts shifted for differential drive normal speed of the axles;

Figure 3 is an end elevation of the transfer case of Figures 1 and 2;

Figure 4 is an enlarged fragmentary section on line 4—4 of Figure 3 illustrating part of the shift fork mechanism;

Figure 4A is a diagrammatic sketch of the interconnection of the shift fork mechanisms;

Figure 5 is a section through a transfer case illustrating the gearing within a 4 x 4 vehicle transfer case embodying the invention; and Figure 6 is a section through a 6 x 6 vehicle transfer case different from the embodiment of Figures 1–4; and Figure 7 is a diagrammatic view illustrating the invention as embodied in another environment.

Referring to Figures 1 and 2 which illustrate a transfer case drive for a vehicle having one front drive axle and two rear drive axles (a so-called 6 x 6 vehicle), the transfer case in this embodiment comprises a housing 11 which may be made of a suitable number of parts bolted together and comprises a rigid support for mounting a plurality of shafts in parallelism.

An input shaft 12 is suported in a bearing 13 on the housing side wall. Shaft 12 is driven from the power plant of the vehicle in the usual manner. Within the housing the reduced end of shaft 12 is piloted in a bearing 14 recessed into one side of a gear 15 on a shaft 16 journaled in a bearing 17 on the opposite side wall of the housing.

Intermediate bearings 13 and 14, shaft 12 is formed with splined sections 18 and 19 on which are slidably but nonrotatably mounted internally splined gears 21 and 22 of the same size having shifter fork receiving collars 23 and 24, respectively.

Between splined sections 18 and 19, shaft 12 has nonrotatably affixed thereon, as by press fit to prevent axial displacement, the inner race of a bearing assembly 25 whose outer race is secured to a transfer gear 26 at the bottom of a side recess 27. Outwardly of bearing 25 recess 27 is internally splined at 28 so that when gear 21 is shifted to its Figure 2 position it will clutch shaft 12 and gear 26 for rotation together.

Gear 26 is constantly meshed with a ring gear 29 rigid with a longitudinally split differential cage 31. At opposite sides of the differential cage, coaxial stub shaft assemblies 32 and 33 are journaled in the housing walls on bearings 34 and 35, and gears 36 and 37 of the same size are rotatably supported on bearings 38 and 39 respectively on the inner ends of the stub shafts. Gear 37 is constantly meshed with gear 15.

Gears 41 and 42 of the same size are fixed to gears 36 and 37 respectively, each being preferably integral compound intermediate gear clusters. Gear 21 is shown meshed with gear 42, and gear 22 is shown meshed with gear 41, in Figure 1. Differential cage 31 is mounted for rotation on bearings 40 on coaxial opposed stub shafts 43 and 44 rigid with gears 36 and 37 respectively, the gear clusters being suitably recessed as illustrated to clear the cage.

Within the differential cage 31, side gears 45 and 46 are secured non-rotatably on shafts 43 and 44 respectively, and the side gears are constantly meshed with pinions 47 (only two shown) idly journaled on the four arms of a conventional cross-shaped spider 48 which is rotatable with cage 31.

Gear 36 is constantly meshed with a gear 49 of the same size as gear 15 fixed on a supporting shaft 51 journalled on bearing 52 in the housing side wall. Gear 49 is internally recessed at one side for mounting a bearing 53 which pilots the inner end of a coaxial shaft 54 that is also supported in bearing 55 on the opposite side wall. Outwardly of the bearing 53, the recess in gear 49 has a splined section 56 adapted to receive a toothed clutch element 57 having a shifter fork receiving collar 58 and being slidably but non-rotatably mounted on splines 59.

Gear 37 is constantly meshed with a gear 61 of the same size as gear 15 mounted on the bearing 62 which is axially fixed on shaft 54. Gear 61 is internally splined at 63 to receive or be disengaged from a toothed clutch element 64 slidably splined on section 65 of the shaft 54 and having a shifter fork receiving collar 66.

Gear 49 is constantly meshed with a gear 67 of the same size supported on a bearing 68 that is axially fixed upon a shaft 69 mounted in bearings 71 and 72 in the opposite side walls of the housing and projecting forwardly from the housing. Shaft 69 has a splined section 73 for slidably and non-rotatably mounting a toothed clutch element 74 having a shifter fork receiving collar 75. Gear 67 is internally splined at 76 for clutching engagement with element 74.

Referring to Figure 4, shifter forks 77 and 78 are fixed on a rail 79 that is slidably mounted on the housing are connected to the collars 23 and 24. Clutch element 74 is controlled by a shifter fork 81 mounted on a slidable rail 82.

In the vehicle as above indicated shaft 12 is driven from the prime mover through the conventional clutch and transmission assembly, manual or automatic. Shafts 16 and 54, which are located with their axes in a vertical plane, are connected to the drive axles of a conventional tandem drive axle assembly at the rear of the vehicle. These axles may be single speed or two-speed axles. Shaft 69 is connected to the usual steer drive front axle.

With the parts in the positions illustrated in Figure 1, all three drive axles, front and rear, are positively and directly driven at low speed from shaft 12. Power is transmitted directly to shaft 16 through gear 21, gear cluster 42, 37 and gear 15. Power is transmitted to shaft 54 through gear 21, gear cluster 42, 37 and gear 61 which is clutched to shaft 54 by clutch element 64. Power is transmitted to the front axle drive shaft 69 through gear 22, gear cluster 41, 36, gear 49 which rotates idly, and gear 67 which is clutched to shaft 69 by the clutch element 74. Since gears 15 and 61 are of the same size the same speeds of rotation are imparted to the rear axle drive shafts 16 and 54. Since gear 26 is idly rotatable and cage 31 is idly rotatable on shafts 43 and 44 the differential is bypassed in this shifted position of the parts, which is that desirable for poor traction driving conditions.

To provide a differential drive between the rear axles on the one hand and the front axle on the other hand, gears 21 and 22 are shifted together to the right in Figures 1 and 2 by sliding rail 79 until gear 21 assumes its Figure 2 position to disengage from gear 42 and to clutch gear 26 to shaft 12 and to disengage gears 22 and 41. In this position of the parts (which is not shown in any one figure of the drawing) the differential cage is driven from shaft 12 and gears 36 and 37 are differentially driven. Gear 37 remains positively drive connected to the rear axles through gears 15 and 61, respectively, and gear 36 remains positively drive connected to the front axle drive shaft through gears 49 and 67.

This differential drive relation between the rear axles on the one hand and the front axle on the other hand is entirely novel in a 6 x 6 vehicle to my knowledge.

By shifting rail 82 it is possible to disengage the front axle drive clutch 74 from gear 67. Preferably, as shown in Figure 4A, a slidable rail 60 is connected to parallel rail 82 by an intermediately pivoted link 80, so that suitable shifter forks on rail 60 shift clutch elements 57 and 64 to their Figure 2 position when the front axle clutch 74 is moved to its Figure 2 disengaged position. This drive relation of the parts is shown in Figure 2. No drive is transmitted to the front axle. Gears 36 and 37 are differentially driven. Gear 37 is positively drive connected to shaft 16. Gear 36 is positively drive connected to shaft 54, clutch element 64 being disengaged. Thus the differential in the transfer case serves as an interaxle differential between rear axle drive shafts 16 and 54.

With clutches 57, 64 and 74 in the position shown in Figure 2, the rail 79 may be actuated to shift gears 21 and 22 from the Figure 2 position to the direct drive position of Figure 1 where they are meshed with gears 42 and 41 respectively. This provides a positive drive from shaft 12 through gears 21, 42, 37 and 15 to shaft 16, and through gears 22, 41, 36 and 49 and clutch element 57 to shaft 54.

The structure of Figures 1 and 2 may be modified by elimination of gear 61 and clutch element 64, and by keying gear 49 to rotate with shaft 54. In this modified construction, with the front axle clutch disengaged, the rear axles may be driven directly or differentially. During direct drive the front axle clutch 74 may be engaged so that all axles may be positively directly driven.

The invention in practice may be installed in conventional transfer case housings without requiring new bearings or other drastic changes. For example, for converting one of these conventional transfer cases to incorporate the invention, a kit may be provided comprising essentially the shaft 12 with gears 21, 22 and 26 mounted on it to replace the prior input shaft, and the differential and gear cluster assembly to replace the usual counter shaft and gearing.

It will be appreciated that the illustrated bearing supports and manner of mounting the parts are not critical and may be revised to meet engineering practices without departing from the spirit of the invention.

Figure 5 illustrates a 4 x 4 vehicle drive embodying the invention wherein the aligned front and rear axles may be positively driven from the input shaft or driven through a differential mechanism which provides a gear reduction. Since certain parts are identical with the structure of Figures 1 and 2 except that the rear end of shaft 12' is mounted in a housing wall bearing 50, the same reference numerals will be employed. The drive train down to gears 36 and 37 is exactly the same as in Figures 1 and 2.

Gear 37 is constantly meshed with a gear 83 rigid with rear axle drive shaft 84 which is supported in housing bearing 85 and is internally recessed to receive a pilot bearing 86 supporting the end of a short coaxial shaft 87 having rigid therewith a gear 88 constantly meshed with gear 36.

Shaft 87 is splined at 89 for non-rotatably slidably mounting a toothed clutch element 91 adapted to engage or disengage a similarly splined section 92 in the recess of gear 83. Clutch element 91 has a shifter fork collar 93.

The front axle drive shaft 94 is rotatably mounted in a bearing 95 in a cap 96 removably secured to the housing and its inner reduced end is supported in a pilot bearing 97 in a side recess of gear 88. A toothed clutch element 98 having a shifter collar 99 is slidable but non-rotatable upon a splined section 101 of shaft 94 and adapted to engage a splined section 102 of the recess of gear 88 as shown in Figure 5, or disengage from it completely to interrupt the drive to the front axle.

Thus, with the parts as illustrated in Figure 5, the front and rear axles are differentially driven through the transfer case so that differences in travelling speed between the axles are automatically compensated and any tendency toward axle fight is eliminated.

When it is desired to drive both front and rear axles positively, as under poor traction conditions, gears 21 and 22 are shifted together to the left in Figure 5 until they mesh with gears 42 and 41 respectively, thus bypassing the differential as in the 6 x 6 vehicle drive of Figure 1.

If desired the front axle drive may be disengaged in Figure 5, by shifting clutch element 98 to the right. Preferably at the same time I shift clutch element 91 to the left to clutch gear 83 to shaft 87, so that the rear axle is driven through both meshed gear pairs 36, 88 and 37, 83.

The above arrangement is particularly adaptable to installation of the present invention in present day standard 4 x 4 transfer cases that do not embody an optional differential drive.

Referring now to Figure 6, this 6 x 6 vehicle drive structure is exactly the same and the same reference numerals are used down to gears 36 and 37 in the drive trains. The front drive axle assembly is the same as in Figure 5, except that the clutch element 98 is adapted to engage a splined section 103 of a gear 104 constantly meshed with gear 36.

The second rear axle drive shaft 105 is here coaxial with front axle drive shaft 94 and supported in a housing wall bearing 106. A gear 107 constantly meshed with gear 37 is mounted on a bearing 108 in axially fixed relation on shaft 105 and it has a splined bore 109 for receiving a similarly splined clutch element 111 having a shifter fork collar 112 and slidably but non-rotatably mounted on the splined section 113 of shaft 105.

The inner end of shaft 105 is supported in pilot bearing 114 and a bearing 115 recessed in the hub of gear 104 and separated by spacer 116. The end of the gear hub 117 is internally splined at 118 to receive a toothed clutch element 119 having fork shifter collar 121 and slidably but non-rotatably mounted on the splined section 113 of shaft 105.

In the position of the parts shown in Figure 6, gears 36 and 37 are differentially driven. Gear 37 is positively drive connected to rear axle drive shafts 16 and 105 through gears 15 and 107 respectively, the latter being coupled to shaft 113 by clutch element 111. Gear 36 is drive connected to front axle drive shaft 94 through gear 104 and clutch element 98. Thus the rear axles are driven differentially with respect to the front axle.

By shifting gears 21 and 22 to the left to mesh with gears 42 and 41 respectively in Figure 6, the differential is bypassed and the drive to all axles becomes positive.

Starting with the parts as in Figure 6, the two rear axle drive shafts may be differentially driven by shifting all three clutch elements 98, 119, and 111 to the right in Figure 6, preferably as a unit, until shaft 94 is declutched from gear 104, shaft 105 is declutched from gear 107 and gear 104 is clutched to shaft 105. If it is desired to drive only the rear axle drive shafts positively, this can be accomplished by the further shift of gears 21 and 22 to mesh with gears 42 and 41 respectively.

Thus the embodiments of Figures 1, 2 and 6 have essentially the same range of drive conditions. The difference between them is that in Figures 1, 2 the front axle drive shaft is rotated during forward drive in a direction opposite to the rear axle drive shafts because of hypoid gearing in the axles, whereas the Figure 6 transfer case is for non-hypoid drive axles and other drives where the front axle drive shaft rotates in the same direction as the rear axle drive shafts.

Figure 7 illustrates the transfer case or gear box structure of the invention in one embodiment where it is employed in the drive to two closely spaced tandem drive axles of a six wheel vehicle having non-driven dirigible front wheels.

This vehicle comprises a front axle 120 and tandem rear drive axles 121 and 122. An engine 123 supported on chassis 124 is connected by propeller shaft 125 to a transfer case which, by way of example, may be the structure of Figure 5 with shafts 84 and 94 drive connected to axles 121 and 122 respectively. When input shaft 12' is driven the tandem axles may be selectively driven either directly or through the differential and strains due to interaxle fight may be minimized when the vehicle is traveling over rough country. In this embodiment clutch 98 could be locked in engaged position, or gear 88 made integral with shafts 87 and 94 and clutch element 91 can be locked in engaged position or eliminated as long as the end of shaft 87 is piloted in bearing 86.

It will be appreciated that depending on the type, structure and arrangement of the drive axles the levels of shafts 84 and 94 may be altered to suit any particular tandem axle assembly, without departing from the spirit of this phase of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a transfer case, an input shaft, two output shafts, spaced gear assemblies each comprising a large gear and a smaller gear mounted to rotate together, each large gear being of the same size and each small gear being of the same size, differential mechanism comprising a rotatably mounted cage, a spider mounted on the cage, pinions on said spider and side gears meshed with said pinions, said side gears being non-rotatably connected to the respective gear assemblies so that the latter may be differentially rotated through said mechanism, means drive connecting each of said gear assemblies to one of said output shafts, clutch means shiftable from a first position drive coupling said input shaft to said cage to a second position drive coupling said input shaft to both of said gear assemblies for driving both of said gear assemblies in the same direction.

2. In the transfer case defined in claim 1, said output shafts being drive connected to said smaller gears, and said clutch means being adapted to couple said input shaft to said larger gears when direct drive is selected.

3. In the transfer case defined in claim 1, a transfer gear rotatable with respect to said input shaft, a gear on said cage constantly meshed with said transfer gear, and said clutch means being slidable on said input shaft for coupling the input shaft either to said transfer gear or to both of said larger gears.

4. In the transfer case defined in claim 3, said transfer gear being rotatably mounted in axially fixed relation on said input shaft.

5. In a transfer case, an engine driven input shaft, differential mechanism comprising a rotatably mounted cage, a gear mounted to rotate with said cage, opposite side gear driven shafts on said differential mechanism, a pair of gears of the same size rotatable with each said side gear shaft, clutch means for drive connecting said input shaft either to both of said pair of gears for positively driving said pair of gears in the same direction or to said gear on the differential cage for differentially driving sad pair of gears, two output shafts each adapted for connection to a separate drive axle, and mechanism for drive connecting said output shafts individually to said respective side gear shafts.

6. In the transfer case defined in claim 5, said clutch means comprising a gear rotatably mounted on the input shaft and meshed with said cage gear, two clutch elements slidable on said input shaft and shiftable together between a position where both are meshed with said pair of gears and where one is connected to said gear on the input shaft and the other is inoperative.

7. In a transfer case, an engine driven input shaft, a differential mechanism having oppositely extending differentially connected shafts, gears rotatable with said differentially connected shafts, two output shafts each carrying a gear meshed with one of said gears, a third output shaft adapted to be geared to the other of said gears rotatable with said differentially connected shafts, and means for selectively connecting said input shaft to drive said differential mechanism or bypassing said differential mechanism for positively drive connecting both of said gears rotatable with said differentially connected shafts to said input shaft.

8. In a transfer case for a multi-drive axle vehicle, an engine driven input shaft, a differential mechanism operably connected to said input shaft and having oppositely extending differentially connected shafts, intermediate gears rotatable with said shafts, two rear axle drive shafts, a gear meshed with one of said intermediate gears and secured for rotation with one of the rear axle drive shafts, a second gear meshed with said one intermediate gear and means for releasably clutching said second gear to the other of said rear axle drive shafts, a third gear meshed with the other of said intermediate gears and means for releasably clutching said third gear to said other rear axle drive shaft, a front axle drive shaft, a fourth gear rotatable about the axis of said front axle drive shaft and meshed with said third gear, and means for releasably clutching said fourth gear to said front axle drive shaft.

9. In a transfer case for a vehicle having a front drive axle and at least one rear drive axle, an engine driven input shaft, an output shaft adapted to drive the front axle, an output shaft adapted to drive said one rear axle, all of said shafts being substantially parallel and extending longitudinally of the vehicle, means in said transfer case defining a power train including differential gearing for differentially drivng both of said output shafts from said input shaft, means in said transfer case defining a different power train bypassing said differential so that no power is transmitted through the gear teeth of said differential gearing for positively non-differentially driving both of said output shafts from said input shaft, said power trains otherwise having a plurality of common elements, and clutch means in said mechanism for shifting from one power train to the other.

10. In a transfer case for a multi-drive axle vehicle, an engine driven input shaft, a differential mechanism operably connected to said input shaft and having differentially connected intermediate gears on opposite sides, two rear axle drive shafts, a first gear meshed with one of said intermediate gears and secured for rotation with one of said rear axle drive shafts, a second gear meshed with said one intermediate gear and means for releasably clutching said second gear to the other of said rear axle drive shafts, a third gear meshed with the other of said intermediate gears and means for releasably clutching said third gear to said other rear axle drive shaft, a front axle drive shaft coaxial with said other rear axle drive shaft, and means for releasably clutching said front axle drive shaft to said third gear.

References Cited in the file of this patent

UNITED STATES PATENTS

| | | |
|---|---|---|
| 1,336,643 | Lowry | Apr. 13, 1920 |
| 1,506,755 | Keim | Sept. 2, 1924 |
| 2,158,320 | Bock | May 16, 1939 |
| 2,179,171 | Boho | Nov. 7, 1939 |
| 2,203,282 | Keese | June 4, 1940 |
| 2,309,441 | Cook | Jan. 26, 1943 |
| 2,383,873 | MacPherson | Aug. 28, 1945 |
| 2,395,108 | Donley et al. | Feb. 19, 1946 |
| 2,449,546 | Buckendale et al. | Sept. 21, 1948 |
| 2,589,844 | Moore | Mar. 18, 1952 |
| 2,603,108 | Carlson | July 15, 1952 |